US009383839B1

(12) United States Patent
Rost et al.

(10) Patent No.: US 9,383,839 B1
(45) Date of Patent: Jul. 5, 2016

(54) CONFIGURATION OF A PROFILE ASSOCIATED WITH A STYLUS

(71) Applicant: Amazon Technologies, Inc., Seattle, WA (US)

(72) Inventors: Robert Duane Rost, Seattle, WA (US); Erik Jacob Olsen, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/563,966

(22) Filed: Dec. 8, 2014

(51) Int. Cl.
G06F 3/038 (2013.01)
G06F 3/0354 (2013.01)

(52) U.S. Cl.
CPC ............ G06F 3/038 (2013.01); G06F 3/03545 (2013.01)

(58) Field of Classification Search
CPC G06F 3/03545; G06F 3/04883; G06F 3/0317
See application file for complete search history.

(56) References Cited

U.S. PATENT DOCUMENTS

| 6,418,424 | B1 * | 7/2002 | Hoffberg | G06F 3/00 386/E5.004 |
|---|---|---|---|---|
| 2005/0017958 | A1 | 1/2005 | Silverbrook et al. | |
| 2005/0243373 | A1 | 11/2005 | Silverbrook et al. | |
| 2009/0223300 | A1 | 9/2009 | Lapstun et al. | |
| 2011/0086611 | A1 * | 4/2011 | Klein | H04M 15/00 455/407 |
| 2013/0307829 | A1 | 11/2013 | Libin | |
| 2014/0333588 | A1 | 11/2014 | Lo et al. | |

OTHER PUBLICATIONS

"Scribble—color without limits"; http:/getscribblepen.com; copyright 2014; accessed Nov. 11, 2014; 8 pages.
John Seymour; "John the Math Guy: Color Picker Pen"; http://johnthemathguy.blogspot.com/2013/10/color-picker-pen.html; Oct. 23, 2013; accessed Nov. 11, 2014; 6 pages.

* cited by examiner

Primary Examiner — Ricardo L Osorio
(74) Attorney, Agent, or Firm — Baker & Hostetler LLP

(57) ABSTRACT

A stylus may comprise a configurable profile to control one or more local and remote operational features. One or more computing devices may be in communication with the stylus. The one or more computing devices may be configured to receive information relating to the reconfiguration of the settings of the operational profile, reconfigure the operational profile based at least in part on the received information, store the reconfigured operational profile, and associate the reconfigured operational profile with the stylus, wherein the at least one operational feature of the stylus is modified based on the reconfigured operational profile.

20 Claims, 13 Drawing Sheets

CONFIGURATION OF A PROFILE ASSOCIATED WITH A STYLUS

BACKGROUND

Touchscreen displays (or touchscreens) are visual displays that allow user interaction with the displayed image by touching the screen. Touchscreens may sense one or more touches at any given time and interpret the touches as a user input. Touches of a touchscreen may include any number of gestures, such as a point touch, a swipe, a pinch and the like. The different gestures may be interpreted as different user inputs, such as a point touch to make a selection, a swipe to scroll, a pinch to zoom and the like. Touchscreens may provide users with the convenience of not needing large input devices, such as a mouse, a keyboard and the like, to provide inputs to a user device.

Touchscreens are increasingly common in many computing devices, such as tablet computers, cell phones, gaming machines, laptop computers, GPS devices, car entertainment systems and the like. Many of these devices may be communicatively connected to communication networks, such as WiFi networks, cellular data networks and the like. Such devices may allow for convenient user input via a touchscreen while providing access to many computing resources accessible via a communication network.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

There are many types of touchscreens. Regardless of the type of touchscreen used, a user may interact with the touchscreen using a touchscreen input device. A touchscreen input device is a device that includes an end that may be used to interact with a touchscreen. The end may include a capacitive tip, an electrical conductor on the tip, an insert such as a nib, and the like. The end may be configured to receive replaceable nibs. One example of a touchscreen input device is a stylus. As a further example, the stylus may have a configurable profile for selectively controlling at least one operational feature of the stylus. As such, the touchscreen responds to the stylus based on the settings established in the configurable profile. In an aspect, one or more of a tactile, audible, and visual feedback may be implemented via the touchscreen and/or the stylus based on the configurable profile. The configurable profile may travel with the stylus, and may carry over between touchscreens or between various computer devices.

Figure 1:
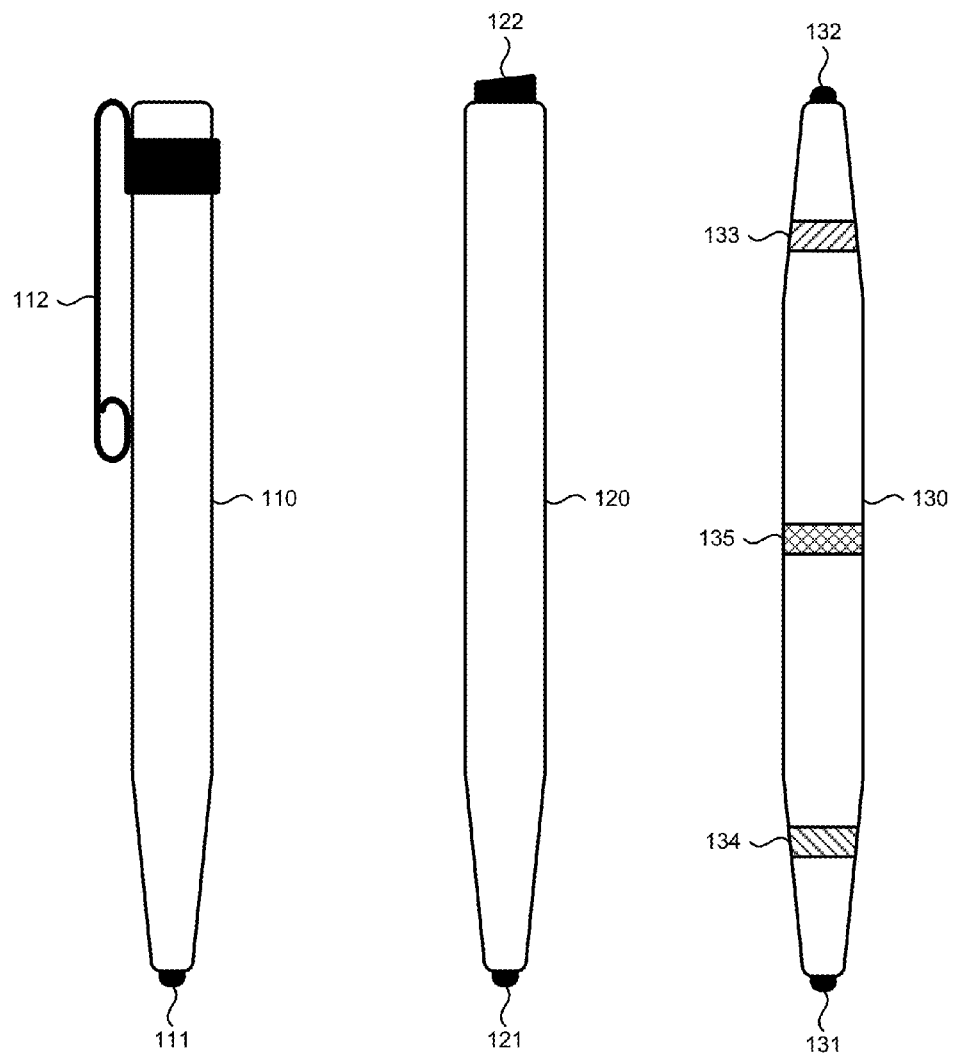
FIG. 1 depicts examples of styli that may be used to provide inputs into touchscreen devices.

FIG. 1 depicts examples of styli that may be used to provide inputs into touchscreen devices. Stylus 110 is a single-end stylus with one capacitive end 111. Stylus 110 is in the form of a pen and includes a clip 112. When the capacitive end 111 is brought close to or in contact with a touchscreen, the touchscreen may interpret the motion of the capacitive end 111 as a touch of the touchscreen. Stylus 120 is a dual-end stylus with a first capacitive end 121 and a second capacitive end 122. In the case of stylus 120, the first capacitive end 121 is smaller, like the tip of a pen or pencil, and may be referred to as the tip end of stylus 120. The second capacitive end is larger, like the eraser of a pencil, and may be referred to as the eraser end of stylus 120. Stylus 130 is another dual-end stylus with a first capacitive end 131 and a second capacitive end 132. In the case of stylus 130, the first capacitive end 131 and second capacitive end 132 are approximately the same size and the stylus 130 itself is approximately symmetrical. One or more of the capacitive ends may comprise a replaceable insert such as a nib. Possible uses of the two ends of a dual-end stylus are described in more detail below.

A stylus may also include any number of other features. For example, a stylus may have features that may aid a computing device in determining an orientation of the stylus with respect to the device. For example, the stylus 130 includes a first color region 133 and a second color region 134. These color regions 133 and 134 are shown as striped, but could also be dots or any other shape. The color regions 133 and 134 may be different colors so that a camera or other light-sensing component on a computing device may determine which end of the stylus 130 is closest to the computing device. The stylus 130 could also include a third color region 135 (or any number of other color regions) to aid in determining the orientation of the stylus 130 with respect to the computing device. Having more than two color regions may help determine orientation in the case where one of the color regions is obscured, such as being obscured by the user's hand. In another example, different ends of the stylus may emit light, or other electromagnetic radiation, at different wavelengths. In this example, a stylus may emit red light from one end and blue light from the other end and the computing device may be able to determine the color of light emitted from the end closest to the computing device. Similar examples are possible with non-visible electromagnetic radiation, such as infrared or ultraviolet electromagnetic radiation. In yet another example, a stylus may include reflective portions that reflect light or other electromagnetic radiation emitted by a computing device Other features of a stylus may include magnetic ends that may be detected by a computing device, buttons that allow for additional user inputs, microphones that may record sound, speakers that may play sounds, haptic elements that may respond to user interactions, lasers that may emit light in a particular direction or any other similar feature. Some features of such a stylus may require power and the stylus may include a battery or other power source. In one example, a battery in a stylus may be charged inductively from a computing device that is in proximity with the stylus so that the stylus recharges as it is used to provide inputs to a computing device.

Figure 2A:
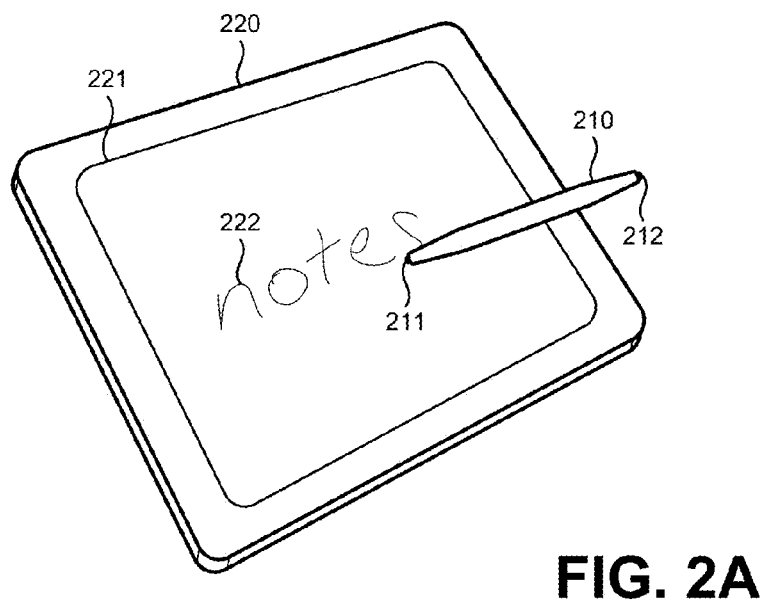
FIGS. 2A and 2B depict instances of a stylus being used with a computing device.
Figure 2B:
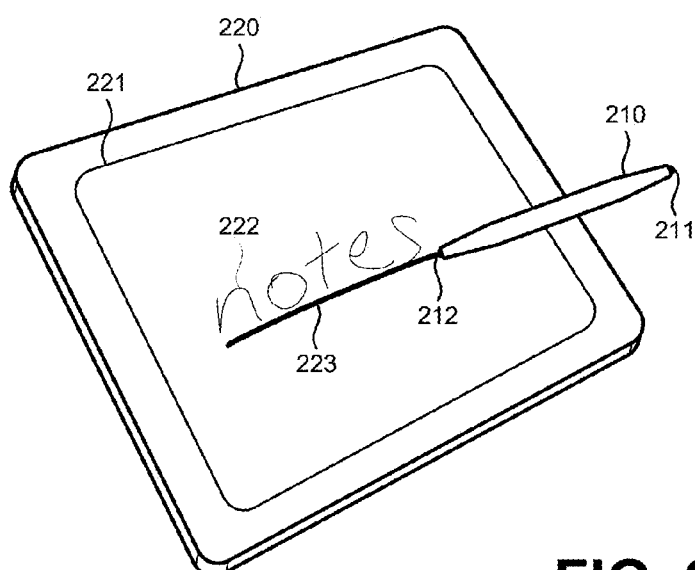

FIGS. 2A and 2B depict instances of a stylus 210 being used with a computing device 220. In the particular instances shown, stylus 210 is a dual-end stylus with a first capacitive end 211 and a second capacitive end 212, and computing device 220 is a tablet with a touchscreen 221. In the instance shown in FIG. 2A, the first capacitive end 211 of the stylus 210 is used to input letters 222 into the touchscreen 221. To make the letters 222, the user may press the first capacitive end 211 of the stylus 210 into the touchscreen 221 and then drag the first capacitive end 211 of the stylus 210 across the touchscreen 221. In the instance shown in FIG. 2B, the second capacitive end 212 of the stylus 210 is used to input a line 223 into the touchscreen 221. To make the line 223, the user may press the second capacitive end 212 of the stylus 210 into the touchscreen 221 and then drag the second capacitive end 212 of the stylus 210 across the touchscreen 221.

In the embodiment shown in FIGS. 2A and 2B, the lines on the touchscreen 221 for the letters 222 are thinner than the line 223 on the touchscreen 221. This difference may be due to the use of different ends of the stylus 210 with the touchscreen 221. This difference may be due to one or more configurable profiles associated with each of the ends of the stylus 210. The one of the first and second capacitive ends 211 and 212 that is used to touch touchscreen 221 may be determined in a number of ways. In one example, the computing device 220 may be able to determine an orientation of the stylus 210. The computing device 220 may include a camera of the computing device 220 that may take an image of the stylus 210 during operation and processing the image to determine which of the first and second capacitive ends 211 and 212 is used to touch touchscreen 221. In another example, the stylus 210 may include a characteristic, such as a magnet near one of the first and second capacitive ends 211 and 212, which may be detected by the computing device 220 to determine which of the first and second capacitive ends 211 and 212 is used to touch touchscreen 221. In another example, the stylus 210 may include one or more sensors, such as a gyroscope, an accelerometer and the like, that may be used to determine orientation of the first and second capacitive ends 211 and 212 with respect to the computing device 220, and the stylus 210 may send an indication of the orientation to the computing device 220 via a wireless communication link, such as a Bluetooth® communication link, a near field communication (NFC) link, a WiFi communication link and the like. In yet another example, the first and second capacitive ends 211 and 212 may have different sizes (such as in the case of the first and second capacitive ends 121 and 122 of stylus 120 in FIG. 1). The touchscreen 221 may be able to sense the different sizes of the first and second capacitive ends 211 and 212 to determine which of the first and second capacitive ends 211 and 212 is used to touch touchscreen 221. Any number of other ways could be used to determine which of the first and second capacitive ends 211 and 212 is used to touch touchscreen 221. The computing device 220 may interpret the uses of the first and second capacitive ends 211 and 212 as different types of user inputs, such as the thin lines of letters 222 and the thick line 223.

While FIGS. 2A and 2B depict user inputs in the form of letters 222 and a line 223, many other user inputs are possible. A stylus may be used to select a group of items, such as files, songs and the like. A stylus may be used to make selections, such as selecting a particular file or song, selecting an option from a list of options and the like. In one example, the first capacitive end 211 of stylus 210 may be used to copy text and/or files, and the second capacitive end 212 of stylus 210 may be used to paste the copies text and/or files. In another example, the first capacitive end 211 of stylus 210 may be used to input information, such as text, lines and the like, and the second capacitive end 212 of stylus 210 may be used to navigate, such as by scrolling, zooming and the like.

Figure 3:
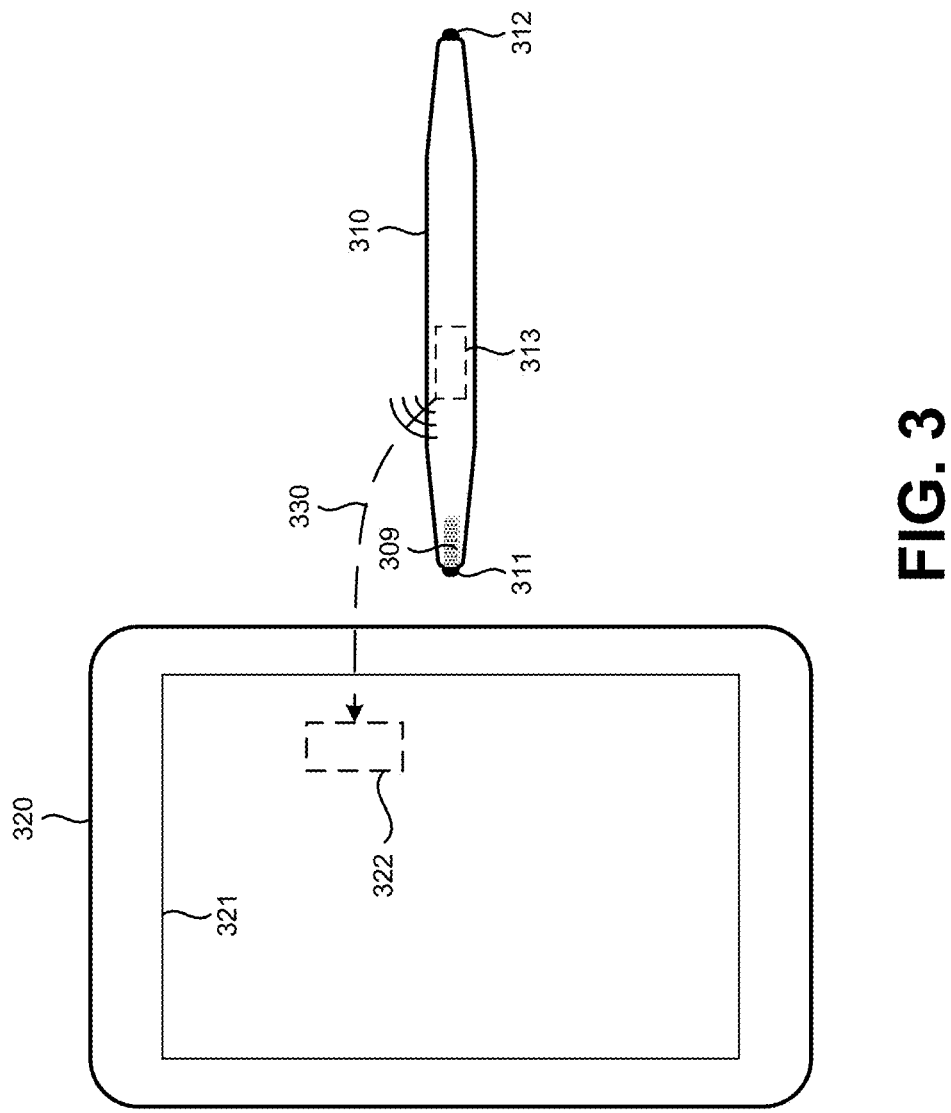
FIG. 3 depicts an embodiment of a touchscreen input device that may communicate an identifier of the touchscreen input device to a computing device.

FIG. 3 depicts an embodiment of a touchscreen input device 310 that may communicate an identifier of the touchscreen input device 310 to a computing device 320. The identifier of the touchscreen input device 310 may be based upon a configurable insert 309 (e.g., nib) received into the touchscreen device 310. For example, each of a plurality of configurable inserts 309 may have a unique identifier associated therewith.

In an aspect, one or more of the inserts 309 may have physical properties that are different from other inserts 309. For example, one or more inserts 309 may be formed from a material having a coefficient of friction, length, width, shape, and the like that is different from another of the inserts 309. The inserts 309 may be formed from various materials and may have various physical properties. As a further example, the identifier associated with a particular insert 309 may represent information relating to the physical properties of the insert 309. In this way, the physical properties can be selected to visually or physically more closely associate a particular insert 309 with a particular real world input instrument such as a paint brush, a pen, a marker, and so on.

As shown in FIG. 3, the touchscreen input device 310 is in the form of a dual-end stylus with a first capacitive end 311 and a second capacitive end 312. As an example, the ends 311, 312 may comprise separate configurable inserts 309. The touchscreen input device 310 also includes a wireless communication device 313. The wireless communication device may comprise a processor for executing operations beyond communication. The wireless communication device 313 may be a Bluetooth® transceiver, a WiFi transceiver, an NFC transceiver or transmitter, a radio frequency identification (RFID) transceiver or transmitter or any other type of wireless communication device. In some embodiments, such as in the case of a Bluetooth® transceiver or a WiFi transceiver, the wireless communication device 313 may be a powered device that received power from a battery or other power source in touchscreen input device 310. In such a case, the power source in touchscreen input device 310 may be an inductively chargeable power source that is charged via an indication field generated by the computing device 320. In other embodiments, the wireless communication device 313 may be a passive device, such as an NFC transmitter or an RFID transmitter, which does not require a power source on the touchscreen input device 310.

The computing device 320 includes a touchscreen 321 and a wireless communication device 322. The first and second capacitive ends 311 and 312 of the touchscreen input device 310 may be used to provide inputs to the touchscreen 321. Wireless communication device 322 may be a Bluetooth® transceiver, a WiFi transceiver, an NFC transceiver or receiver, a radio frequency identification (RFID) transceiver or receiver, or any other type of wireless communication device. The wireless communication device 313 of the touchscreen input device 310 may send a wireless signal 330 to the wireless communication device 322. The wireless signal 330 may carry an identifier of the touchscreen input device 310 (e.g., which may be defined by the configurable insert 309) to the computing device 320. The touchscreen input device 310 may be operable to send the wireless signal 330 at particular times, such as when the touchscreen input device 310 is brought into proximity with the computing device 320, when one of the first and second capacitive ends 311 or 312 of the touchscreen input device 310 is brought into contact with the touchscreen 321 of the computing device 320 and the like. In an aspect, the identifier of the touchscreen input device 310 may be associated with a particular configurable profile. As such, the computing device 320 may respond to the touchscreen input device 310 based on the settings established in the configurable profile. In an aspect, one or more of a tactile, audible, and visual feedback may be implemented via the computing device 320 and/or the touchscreen input device 310 based on the configurable profile.

Figure 4:
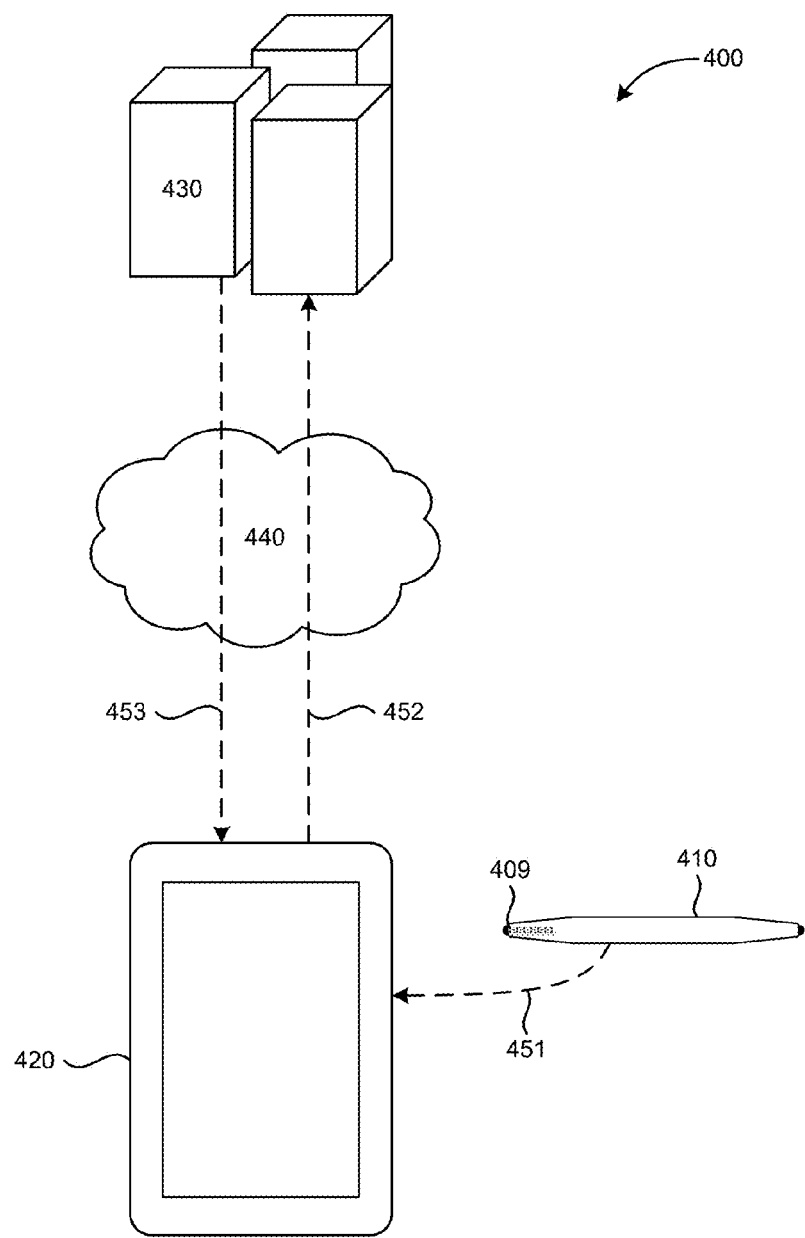
FIG. 4 depicts a system that includes a touchscreen input device, a computing device, one or more servers and a network.

FIG. 4 depicts a system 400 that includes a touchscreen input device 410, a computing device 420, one or more servers 430 and a network 440. The touchscreen input device 410 may send a wireless signal 451 to the computing device 420. The wireless signals 451 may be a Bluetooth® signal, a WiFi signal, an NFC signal, an RFID signal, or any other type of wireless signal. The wireless signal 451 may carry an identifier of the touchscreen input device 410 to the computing device 420. The identifier of the touchscreen input device 410 may be associated with a configurable insert 409 (e.g., nib) received by the touchscreen input device 410. A plurality of inserts 409 may be selectively received by the touchscreen input device 410. As such, each other inserts 409 may have an identifier associated therewith that can be transmitted via the wireless signal 451 to identify the touchscreen input device 410.

The computing device 420 may have configuration information associated with the identifier of the touchscreen input device 410. The configuration information may be associated with or defined by a particular user of the touchscreen input device 410. For example, the computing device 420 may include particular settings that may be set when the computing device 420 receives the identifier of the touchscreen input device 410. If those settings had been defined by a user of the touchscreen input device 410, the user may have those settings set merely by the computing device 420 recognizing the identifier of the user's touchscreen input device 410. Other types of configuration information may be used by computing device 420 when the computing device 420 receives the identifier of the touchscreen input device 410.

After receiving the wireless signal 451 with the identifier of the touchscreen input device 410, the computing device 420 may send a signal 452 via the network 440 to the one or more servers 430. The network 440 may include one or more of a wireless network, such as a WiFi network or cellular data network, and a wired network. The network 440 may include, in part, the Internet, a wide area network or a local area network. The signal 452 may include the identifier of the touchscreen input device 410. The one or more servers 430 may have configuration information associated with the identifier of the touchscreen input device 410. For example, the user may have registered the identifier of the touchscreen input device 410 with the user's account on the one or more servers 430. The user could also provide the one or more servers 430 with configuration information to be provided to computing devices when the one or more servers 430 receive an identifier of the touchscreen input device 410 from the devices. The configuration information may include settings for controlling a sensory feedback of the touchscreen input device 410 and/or the computing device 420.

Figure 5:
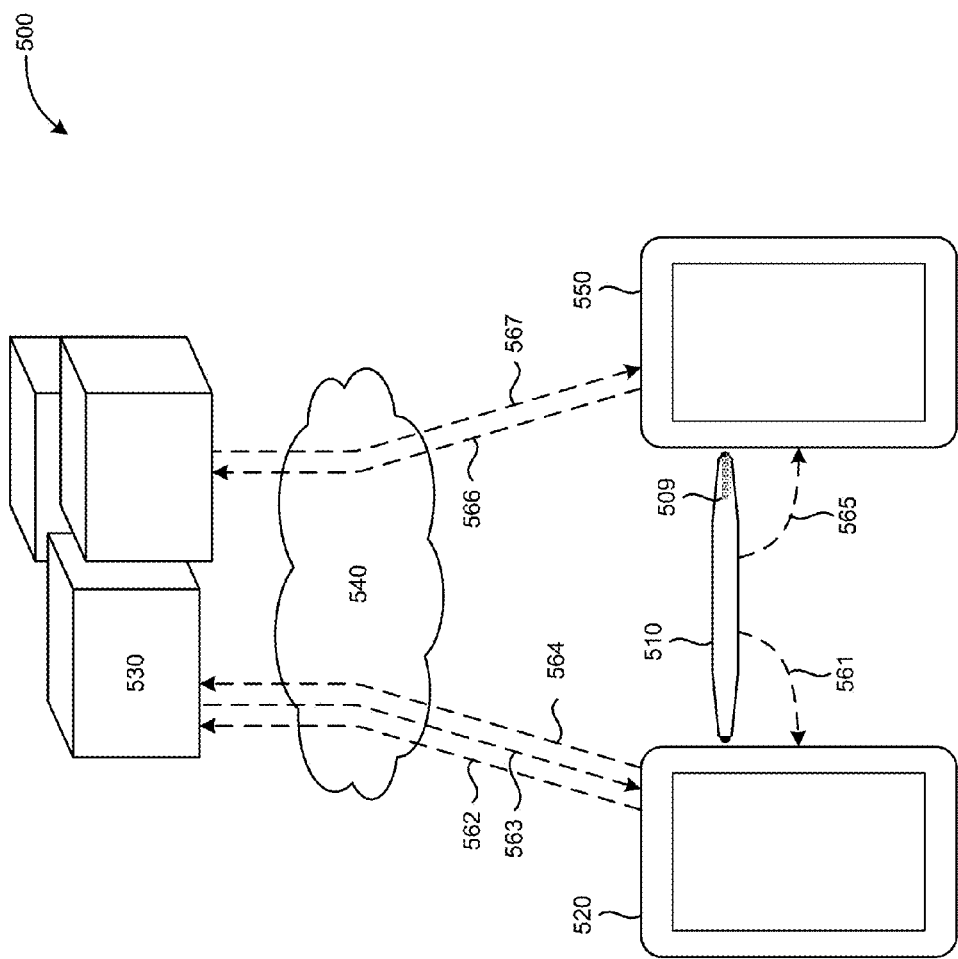
FIG. 5 depicts an example of a system that includes a touchscreen input device, a first computing device, one or more servers, a network and a second computing device.
Figure 6:
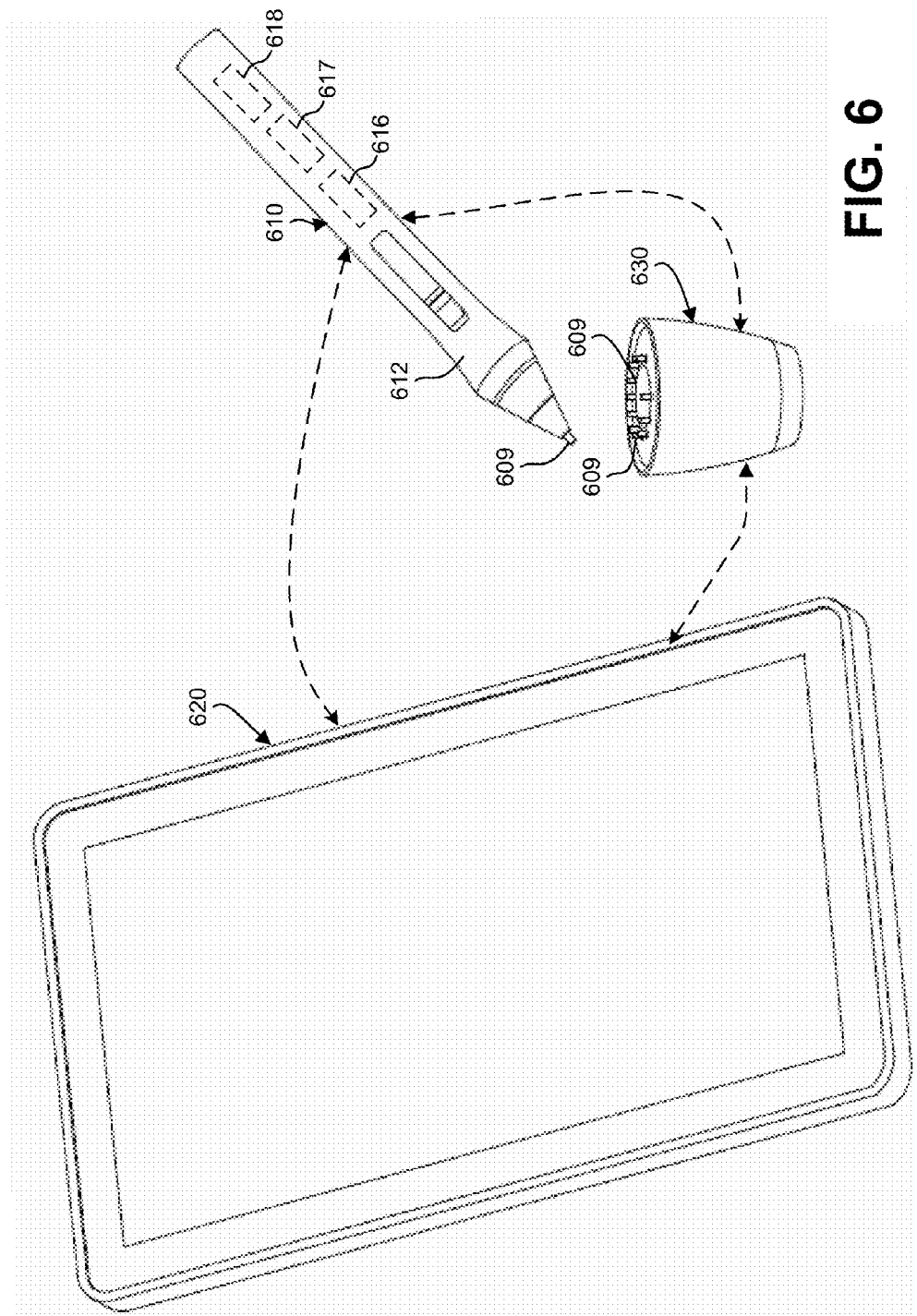
FIG. 6 depicts an example of a system that includes a touchscreen input device, a computing device, and a configuration device.
Figure 13:
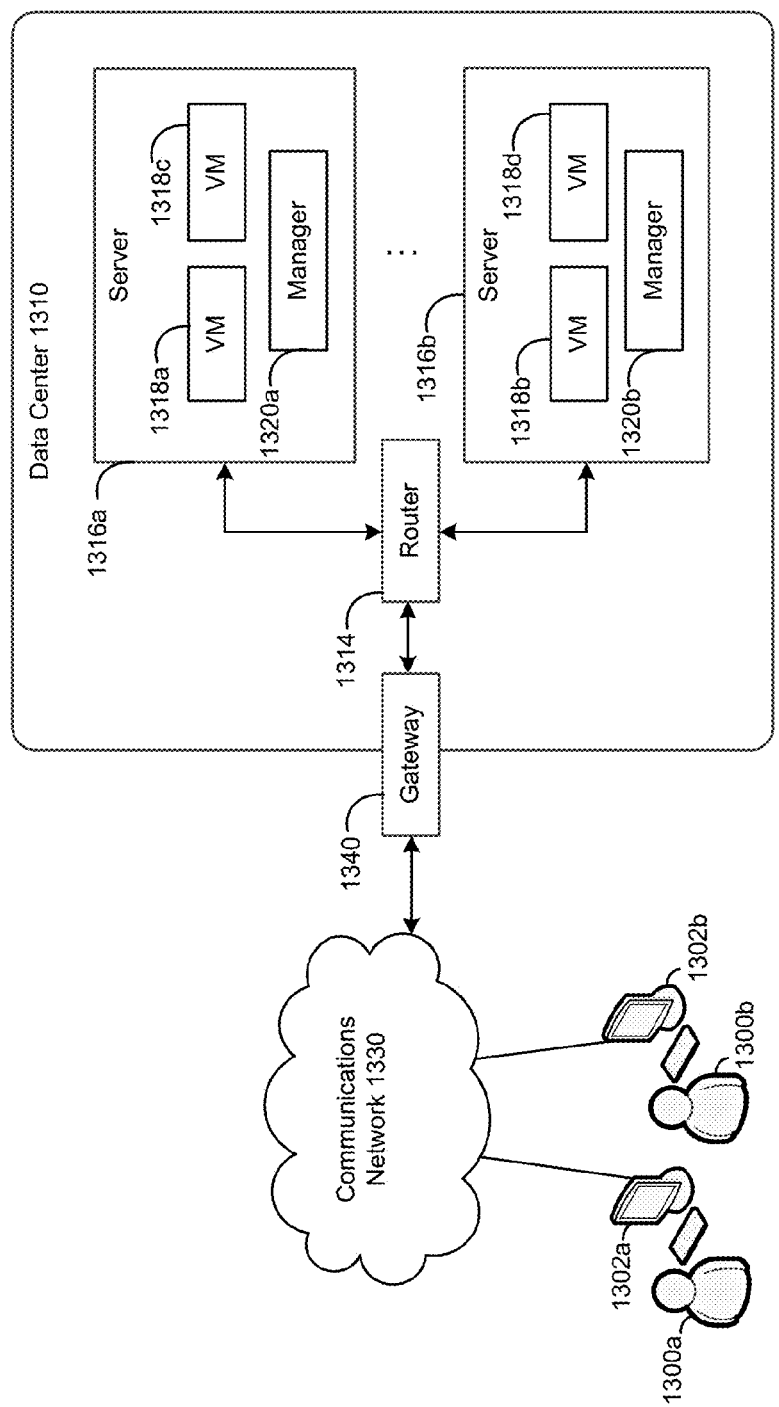
FIG. 13 depicts a diagram illustrating an example computing system that may be used in some embodiments.

FIG. 5 depicts an example of a system 500 that includes a touchscreen input device 510, a first computing device 520, one or more servers 530, a network 540 and a second computing device 550. When the touchscreen input device 510 is in proximity with the first computing device 520, it may send a wireless signal 561 that includes an identifier of the touchscreen input device 510 to the first computing device 520. The identifier of the touchscreen input device 510 may be associated with a configurable insert 509 (e.g., nib) received by the touchscreen input device 510. The system 500 may be implemented in a datacenter environment such as the datacenter 1310 (FIG. 13).

A plurality of inserts 509 may be selectively received by the touchscreen input device 510. As such, each other inserts 509 may have an identifier associated therewith that can be transmitted via the wireless signal 561 to identify the touchscreen input device 510. If the first computing device 520 includes any configuration information associated with the identifier of the touchscreen input device 510, the first computing device 520 may implement changes indicated by the configuration information. Such changes may include modification of sensory feedback such as tactile, visual, and audio feedback. Such changes may include modification of operational characteristics of the touchscreen input device 510 and its interaction with first computing device 520. For example, the configuration information may determine an operation mode of the touchscreen input device 510 such as a paint mode, pen mode, highlight mode, cut and paste mode, selection mode, and the like. Other operations can be configured by the identifier and associated configuration information. The first computing device 520 may also send a signal 562 with the identifier of the touchscreen input device 510 to the one or more servers 530 via the network 540.

The one or more servers 530 may have configuration information associated with the identifier of the touchscreen input device 510. For example, the user may have registered the identifier of the touchscreen input device 510 with the user's account on the one or more servers 530. The user could also provide the one or more servers 530 with configuration information to be provided to computing devices when the one or more servers 530 receive an identifier of the touchscreen input device 510 from the devices. The configuration information may include settings, owned content and/or one or more actions that may be performed, as described above. The one or more servers 530 may determine configuration information that is associated with the identifier of the touchscreen input device 510 and that is applicable to the first computing device 520. The one or more servers 530 may send a signal 563 via the network 540 to the first computing device 520 indicating the configuration information that is associated with the identifier of the touchscreen input device 510 and that is applicable to the first computing device 520.

The one or more servers 530 may also determine whether the first computing device 520 is owned by a user associated with the touchscreen input device 510. For example, in addition to registering the identifier of the touchscreen input device 510 with the user's account on the one or more servers 530, the user may also have registered the first computing device 520 with the user's account on the one or more servers 530 as being a computing device owned by the user. If the one or more servers 530 determine that the first computing device 520 is owned by a user associated with the touchscreen input device 510, the one or more servers 530 may include in the signal 563 to the first computing device 520 an indication of additional actions that may be performed by the user. For example, the additional actions may include an ability for the user to set configuration information on the one or more servers 530, to make content or text on the first computing device 520 available for use by the touchscreen input device 510 on other computing devices and the like. The additional actions may include any number of other actions that could be performed by the user on a computing device owned by the user.

The user may use the touchscreen input device 510 to interact with the first computing device 520. After using the touchscreen input device 510 to interface with the first computing device 520, the touchscreen input device 510 may be used to interface with the second computing device 550. When the touchscreen input device 510 is in proximity with the second computing device 550, it may send a wireless signal 565 that includes an identifier of the touchscreen input device 510 to the second computing device 550. The identifier of the touchscreen input device 510 may be associated with a configurable insert 509 (e.g., nib) received by the touchscreen input device 510.

If the second computing device 550 includes any configuration information associated with the identifier of the touchscreen input device 510, the second computing device 550 may implement changes indicated by the configuration information. Such changes may include modification of sensory feedback such as tactile, visual, and audio feedback. Such changes may include modification of operational characteristics of the touchscreen input device 510 and its interaction with second computing device 550. For example, the configuration information may determine an operation mode of the touchscreen input device 510 such as a paint mode, pen mode, highlight mode, cut and paste mode, selection mode, and the like. Other operations can be configured by the identifier and associated configuration information. The second computing device 550 may also send a signal 566 with the identifier of the touchscreen input device 510 to the one or more servers 530 via the network 540.

The one or more servers 530 one or more servers 530 may determine configuration information that is associated with the identifier of the touchscreen input device 510 and that is applicable to the second computing device 550. The one or more servers 530 may also determine whether the second computing device 550 is owned by the user of the touchscreen input device 510. The one or more servers 530 may send a signal 563 via the network 540 to the second computing device 550 indicating the configuration information that is associated with the identifier of the touchscreen input device 510 and that is applicable to the second computing device 550. Whether configuration information is applicable to the second computing device 550 may be based, at least in part, on whether the one or more servers 530 determines that the second computing device 550 is owned by the user of the touchscreen input device 510. The one or more servers 530 may send a signal 567 via the network 540 to the second computing device 550 indicating the configuration information that is associated with the identifier of the touchscreen input device 510 and that is applicable to the second computing device 550.

In an aspect, the touchscreen input device 510 may be configured to interact with both of the first computing device 520 and the second computing device 5530 in a joint configuration. For example, the touchscreen input device 510 may be configured to interact with the first computing device 520 as a paintbrush and canvas, respectively. As such, the touchscreen input device 510 may be used to apply programmatic graphics to the screen of the first computing device 520. Additionally, the second computing device 5350 may be configured to supplemental or complement the programmatic operations of the first computing device 520.

In an embodiment of the supplement or compliment to the programmatic operations of the first computing device 520, the touchscreen input device 510 may contact (or come within a threshold proximity of) pre-defined portions of the second computing device 5350 to change an attribute of the configuration information associated with the touchscreen input device 510 and its interaction with the first computing device 520. As a further example, the second computing device 5530 may be configured as a painter's palette, e.g., a painter's palette, to allow a user to maneuver the touchscreen input device 510 to portions of the second computing device 5350 to change or/select a color attribute associated with the touchscreen input device 510. As such, when the touchscreen input device 510 is brought back into proximity of the first computing device 520, the updated color associated with the paintbrush feature of the touchscreen input device 510 may be programmatically applied to the first computing device 520. In this way, the touchscreen input device 510 may interact with the second computing device 5530 to modify configurations of the touchscreen input device 510 that may be applied to interactions between the touchscreen input device 510 and the first computing device 520.

Although an example of a paintbrush and painter's palette is described, it is understood that other programmatic operations may be used for other configurations of multiple computing devices such as a configuration in which the touchscreen input device 510 emulates a fountain pen, the first computing device 520 emulates a writing surface and the second computing device 550 emulates an inkwell.

In an aspect, the configurations of the touchscreen input device 510 may include a programmatic deterioration effect. As an example, an operational profile may comprise settings to facilitate the deterioration effect. The operational profile may be stored remotely from the touchscreen input device 510, such as at the servers 530. When the touchscreen input device 510 begins to interact with the a computing device such as the first computing device 520, the one or more servers 530 may send the signal 563 via the network 540 to the first computing device 520 indicating the configuration information that is associated with the operational profile of the touchscreen input device 510. A timer at the one or more servers 530 may be referenced by the one or more servers 530 to time stamp the transmission of the signal 563. Over a period of use, the one or more servers 530 may send additional signals via the network 540 to the first computing device 520 to update the configuration information that is associated with the operational profile of the touchscreen input device 510. As such, the operation of the touchscreen input device 510 may be modified to emulate the deterioration effect. For example, when the touchscreen input device 510 interacts with the first computing device 510, the first computing device 510 can access or receive the updated configuration information from the servers 530 and can provide a visual feedback based at least in part on the updated configuration information. Over a continued time of interaction, the programmatic visual feedback of the first computing device 510 can fade in intensity as the touchscreen input device 510 as a function of time. As a further example, the deterioration effect may be reset to zero, manually or based on a predefined event such as a user selection or gesture.

The deterioration effect may be applied to programmatic graphics, e.g., paint where the input device 510 is configured as a paintbrush or ink where the input device is configured as a fountain pen, from the touchscreen input device 510 begins to fade over time to emulate, e.g., the effect of a real paintbrush running out of paint or a fountain pen running out of ink during use. To that end, the touchscreen input device 510 may be configured to contact the second computing device 550 to cause the virtual paint of the touchscreen input device 510 to behave in a manner to emulate the effect, e.g., of a real paintbrush being replenished by dabbling it in real paint or a fountain pen in an inkwell.

FIGS. 6, 7A-7C, and 8 depict an example of a system that includes a touchscreen input device 610, a computing device 620, and a configuration device 630. The touchscreen input device 610 may have a main body 612 (e.g., housing) with an aperture 614 configured to receive one of a plurality of configurable inserts 609 (e.g., nibs). Each of the plurality of configurable inserts 609 may have different visual appearance or physical material, to allow the user to differentiate between them, and to provide different friction, resistance, or other physical properties. Each of the plurality of configurable inserts 609 may comprise an identifier 615 such as a graphical, conductive, electromagnetic, and/or mechanical identifier. As an example, the identifier 615 of a select one of the configurable inserts 609 may be communicated to the touchscreen input device 610 via wireless communication (as discussed herein) when the select one of the configurable inserts 609 is received by the touchscreen input device 610.

As another example, the select one of the configurable inserts 609 may comprise multiple conductive bands disposed on a periphery thereof and representing the identifier 615. The conductive bands may be detected by electromagnetic sensors disposed in the touchscreen input device 610 and configured to sense a conductive response caused by the conductive bands to determine the represented identifier. As another example, the select one of the configurable inserts 609 may comprise multiple graphical bands such as a barcode disposed on a periphery thereof and representing the identifier 615. The graphical bands may be detected by optical sensors disposed in the touchscreen input device 610. In yet another example, a mechanical feature such as grooves or ridges embedded in a surface of the insert can be used to represent the identifier 615. The mechanical feature may be detected by a mechanical or electromechanical tumbler system. Other mechanisms for communicating the identifier 615 of a select one of the configurable inserts 309 can be used. The identifier 615 may also be a secure identifier. As an example, touchscreen input device 610 may comprise a security feature configured to authenticate a user of the stylus. As such, operation of the touchscreen input device 610 may be dependent on authentication of the user. Such authentication may comprise facial recognition, fingerprint, credential authentication, voice print, or other authentication techniques. Other mechanisms for communicating the identifier 615 of a select one of the configurable inserts 309 can be used.

In certain aspects, the identifier 615 may be associated with a configurable profile including information for controlling at least one operational feature of the identified configurable insert 609. Since the profile is configurable, a single identifier 615 may be reconfigured to represent different operational settings. For example, a first setting may be a default setting for using the touchscreen input device 610 as a stylus for selection and manipulation of images on the computing device 620. Various settings of the configurable profile may comprise a configuration of a program executing via the computing device 620. For example, a paint program executing via the computing device 620 may be configured to recognize the touchscreen input device 610 as an air brush tool under one setting, but a pencil tool under another setting, and a paint brush under yet another setting. Each setting may relate to various features such as frictional haptics that emulate a friction model; visual feedback such as color, line weight, and line style; pressure feedback controlling an amount of pressure required to cause certain operations to occur; audio feedback; and/or programmatic features of a particular program executing via the computing device 620.

In certain aspects, the profile associated with touchscreen input device 610 (e.g., dependent or independent of the configurable insert 609 received by the touchscreen input device 610) may be changed. For example, the configurable profile may be changed by selectively cycling through a predetermined group of profile settings. As another example, a button, switch, slider, or other user-engageable mechanism may be disposed on the touchscreen input device 610, which allows a user to select a profile from the group of stored profiles. The configurable profile may also be changed by switching out the inserted configurable insert 609 with another of the plurality of configurable inserts 609. Although each of the configurable inserts 609 may have a default configurable profile associated therewith, such configurable profiles may be modified and stored such that the modified profiles can be recalled at a subsequent time or by subsequent devices interacting with the touchscreen input device 610.

Figures 7A, 7B, 7C:
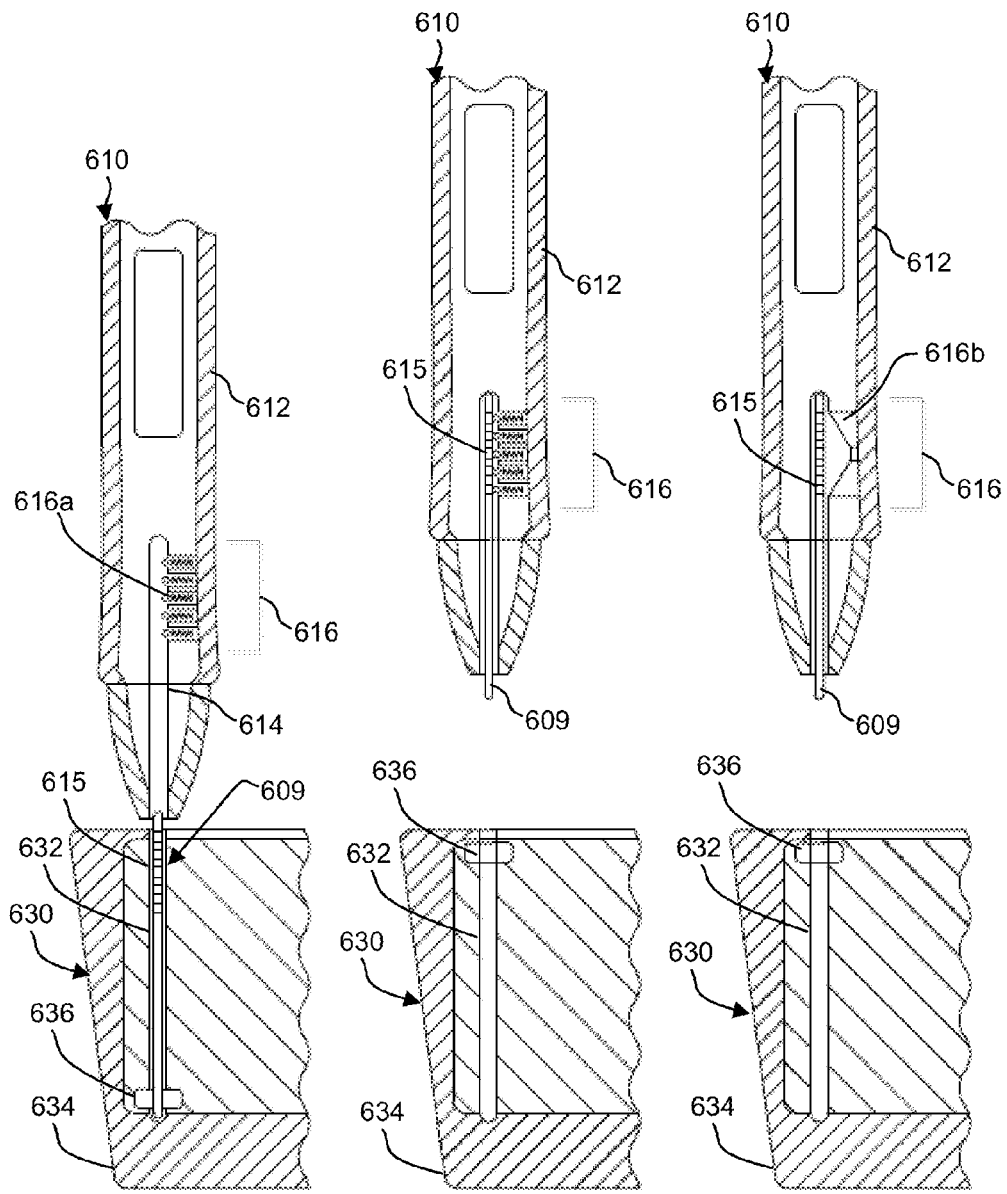
FIG. 7A depicts an example of an interaction of a touchscreen input device and a configuration device.
FIG. 7B depicts an example of an interaction of a touchscreen input device and a configuration device.
FIG. 7C depicts an example of an interaction of a touchscreen input device and a configuration device.

As more clearly shown in FIGS. 7A-7C, a sensor 616 may be disposed in the main body 612 and configured to detect the identifier 615 associated with the one of the plurality of configurable inserts 609, while the one of the plurality of configurable inserts 609 is disposed in the main body 612. As an example, the sensor 616 may be or comprise electrical contacts 616a (FIGS. 7A-7B) configured to align with a portion of the configurable insert 609 while the configurable insert 609 is disposed in the main body 612. The electrical contacts 616a may be configured to operate similarly to a tip-ring-sleeve in that each conductive band of the configurable insert 609 may be detected by the aligned electrical contacts 616a. The presence or absence of any particular conductive band of the configurable insert 609 may corresponds to binary designation (e.g., 1 or 0) to represent the identifier 615. As a further example, the sensor 616 may be or comprise an optical detector 616b (FIG. 7C) configured to align with a portion of the configurable insert 609 while the configurable insert 609 is disposed in the main body 612. The optical detector 616b may be configured to operated similarly to a barcode reader or camera in that each graphical band of the configurable insert 609 may be detected by the aligned optical detector 616b. The pattern of the graphical bands of the configurable insert 609 may corresponds the identifier 615. The identifier 615 may represent other information about the configurable insert 609, such as manufacturer or manufacture date, and/or physical properties such as color, material, and size, for example. Other information can be represented by the identifier 615 of each of the configurable inserts 609.

In an aspect, a sensory feedback element 617 may be disposed in the main body 612 and may be configured to provide one or more of a tactile, audible, and visual feedback via the touchscreen input device 610. The sensory feedback element 617 may be disposed remotely from the touchscreen input device 610 and may be configured to provide a feedback via other devices. As an example, the feedback provided may be based upon the settings of a configurable profile associated with the configurable insert 609 currently inserted in the touchscreen input device 610. As the settings of the configurable profile are modified, the feedback provided by the sensory feedback element 617 may also be modified.

In an aspect, a processor 618 may be disposed in the main body 612 and may be and in communication with the sensor 616 and sensory feedback element 617. The processor 618 may be configured to receive information from the sensor 616 relating to the detected identifier 615. The processor 618 may be configured to determine the configurable profile associated with the detected identifier 615. The processor 618 may be configured to cause the sensory feedback element 617 to provide the one or more of the tactile, audible, and visual feedback based on the configurable profile.

In an aspect, the configuration device 630 may be configured to receive at least one of the configurable inserts 609. As an example, the configuration device 630 may be configured to releasable secure a plurality of the configurable inserts 609. As more clearly shown in FIGS. 7A-7C, the configuration device 630 may comprise at least one channel 632 for releaseably securing at least one of the configurable inserts 609 to a body 634 of the configuration device 630. A securing mechanisms 636 can be configured to slideably engage a portion of the body 634 of the configuration device 630 to facilitate a movement of the configurable insert 609 relative to the body 634 of the configuration device, while the configurable insert 609 is disposed in the channel 632. The securing mechanisms 636 may be configured to selectively engage or release the configurable insert 609. The selective engagement or release of the configurable insert 609 may be based on a wireless communication between the touchscreen input device 610 and the configuration device 630. The selective engagement or release of the configurable insert 609 may be based on a physical hardware setting of own or more of the touchscreen input device 610 and the configuration device 630. Other configurations and mechanisms may be used to facilities the storage and removal of the configurable insert 609 in the configuration device 630.

Figure 8:
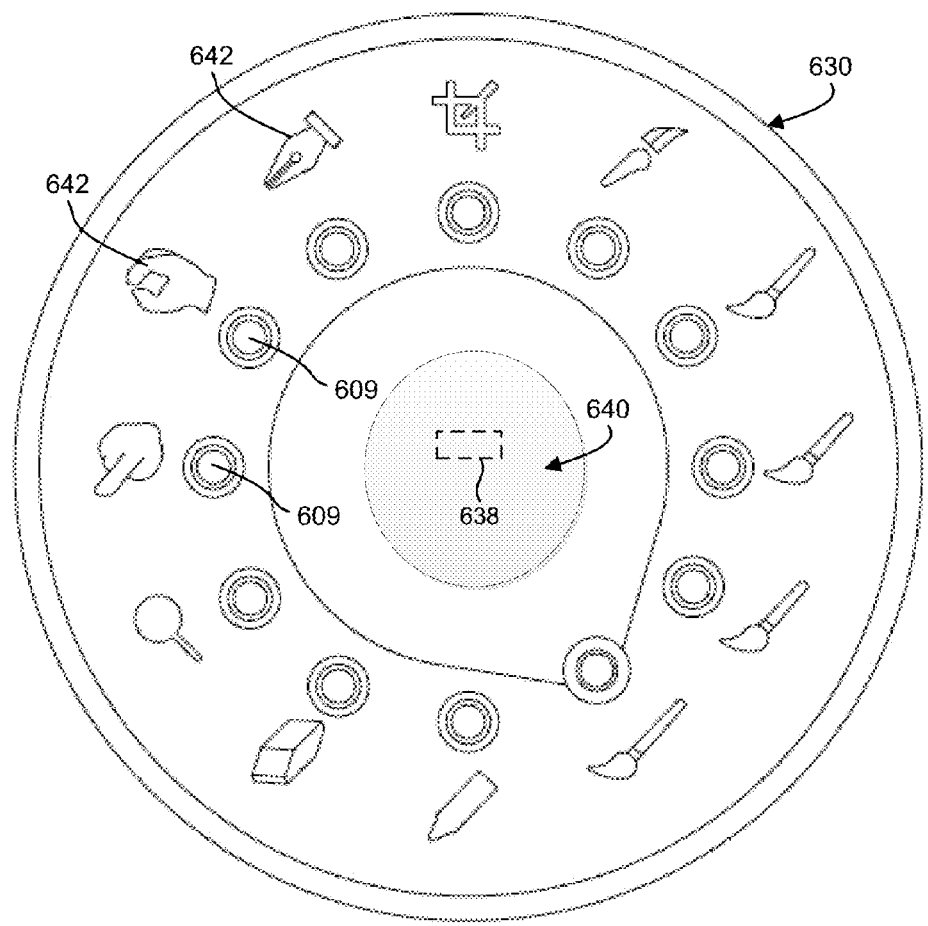
FIG. 8 depicts an example of a configuration device.

As more clearly shown in FIG. 8, the configuration device 630 may comprise a processor 638, a user interface 640, and/or a plurality of tell-tales 642. In an aspect, the processor 638 may be configured to determine which of the plurality of configurable inserts 609 are disposed in the configuration device 630 and which are removed. As an example, the processor 638 may be configured to detect the identifiers 615 associated with each of the configurable inserts 609 to determine whether the configurable inserts 609 are disposed in the configuration device 630. The processor 638 may be configured to generate, store, and/or modify one or more of the configurable profiles associated with the configurable inserts 609. As an example, while a select one of the configurable inserts 609 is inserted in the touchscreen input device 610, the processor 638 may be configured to modify the configurable profile associated with the select one of the configurable inserts 609. As a further example, the user may interact with the user interface 640 to modify the configurable profile associated with the select one of the configurable inserts 609. The user interface 640 may provide feedback to a user relating to the configurable profiles and may receive inputs from the user. As an example, various settings relating to the configurable profile may be presented to the user via the user interface 640 and changes to the settings may be made via the user interface 640 or other interface such as via the computing device 620 in communication with the configuration device 630. In certain aspects, one or more tell-tales 462 or identifiers may be disposed on the configuration device 630 to provide an indication to the user of a particular configuration profile, default profile, and/or settings that are currently active. As the profile of a particular configurable insert 609 changes, the tell-tales 462 may be modified (e.g., selectively illuminated) to indicate such a change to the user. Any indicators or interfaces may be used to communicate information relating to the configurable inserts 609 and/or the associated configurable profiles. In certain aspects, a gesture of the touchscreen input device 610 may be used to configure the profile associated with the configurable insert 609 disposed in touchscreen input device 610. As an example, predefined movement may be executed to cause the profile to change configuration. As a further example, the movement may relate to the configuration device 630. Similar to a fountain pen being moved to an ink well to replenish ink, the touchscreen input device 610 may be moved toward the configuration device 630 and may contact the configuration device 630 or come within a predefined proximity thereof. As such, the ink well movement gesture may automatically configure the profile of the configurable insert 609 disposed in touchscreen input device 610. Other gestures or mechanism may be used to configure the configurable insert 609 disposed in touchscreen input device 610.

In an aspect, the touchscreen input device 610 and/or the configuration device 630 may send a wireless signal to the computing device 420. The wireless signals may be a Bluetooth® signal, a WiFi signal, an NFC signal, an RFID signal, or any other type of wireless signal. The wireless signal may carry an identifier (e.g., identifier 615) of the touchscreen input device 610 to the computing device 620. The identifier of the touchscreen input device 610 may be associated with one of the configurable inserts 609 (e.g., nib) received by the touchscreen input device 610. The computing device 620 may have configuration information (e.g., configurable profile) associated with the identifier of the touchscreen input device 410. The configuration information may be stored remotely from the computing device 620 and transmitted thereto. The configuration information may be associated with or defined by a particular user of the touchscreen input device 610. For example, the computing device 620 may include particular settings that may be set when the computing device 620 receives the identifier of the touchscreen input device 610. If those settings had been defined by a user of the touchscreen input device 610, the user may have those settings set merely by the computing device 620 recognizing the identifier of the user's touchscreen input device 610. Other types of configuration information may be used by computing device 620 when the computing device 620 receives the identifier of the touchscreen input device 610.

Figure 9:
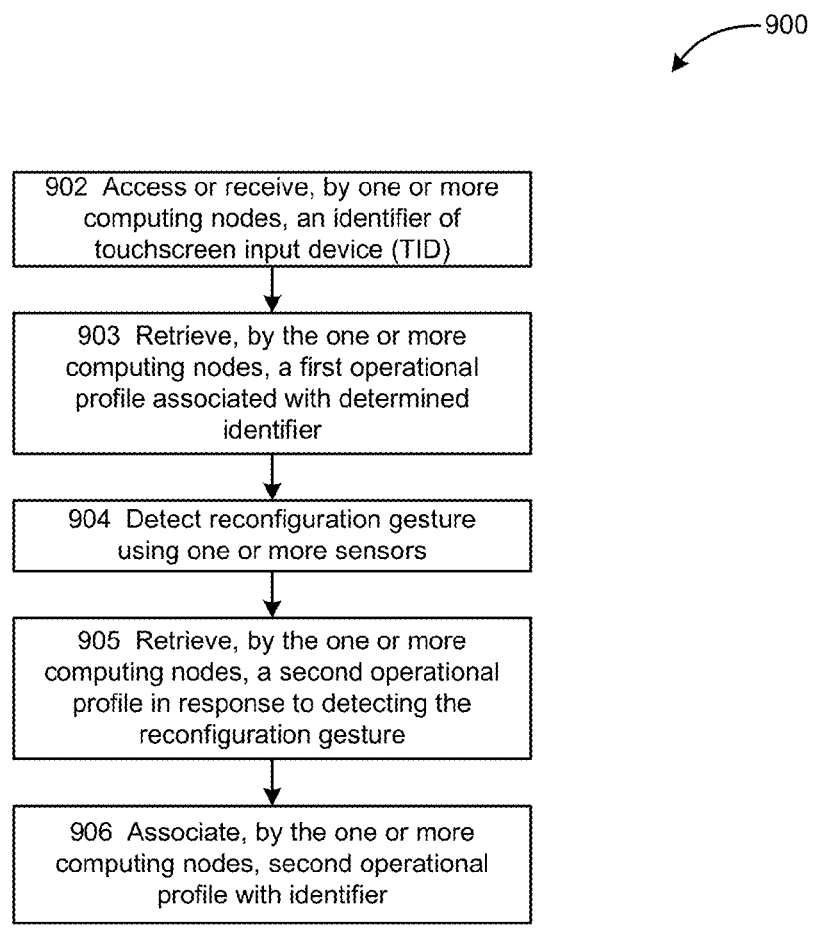
FIG. 9 depicts an example of a method by which a user of a touchscreen input device may be configured.

FIG. 9 depicts an example operating procedure 900 for reconfiguring an operational profile associated with an insert for a touchscreen input device such as a stylus. The example operating procedure 900 may be performed by one or more computing nodes (e.g., processor, computing device, physical host, virtual machine, etc.) to facilitate the retrieval of one or more operational profiles and application of the one or more operational profiles to effect an output of the touchscreen input device. The operating procedure 900 will be discussed in reference to FIGS. 5, 6, and 9.

At block 902, the one or more computing nodes such as servers 530 may receive or access an identifier of a touchscreen input device. Other computing nodes such as the computing devices 520, 620 may receive or access the identifier. The identifier of the touchscreen input device may be received or accessed via a wireless signal, such as an NFC signal, a Bluetooth® signal, a WiFi signal and the like. The identifier of the touchscreen input device may detected by one or more of an electrical contact and an optical sensor. The identifier of the touchscreen input device may be stored in the one or more computing nodes. For example, the one or more computing nodes may have stored profile information associated with the identifier of the touchscreen input device, configuration settings associated with the identifier of the touchscreen input device touchscreen input device or any other type of settings.

At block 903, a first operational profile associated with the detected identifier may be retrieved by the one or more computing nodes. The one or more computing nodes may transmit settings (e.g., based on the first operational profile) to computing devices 520, 620 to control the feedback based on the interaction of the touchscreen input device and the computing devices 520, 620. In an aspect, the first operational profile may be retrieved from a data store (e.g., at the server 530) based on the detected identifier. The datastore may be disposed remotely from the touchscreen input device or integrated with the touchscreen input device. As an example, the detected identifier may be used as part of a query or look-up to retrieve the stored first operational profile. As another example, the detected identifier may be mapped or linked to a location of the first operational profile. The first operational profile may be a configurable profile and may include first settings for controlling at least one operational feature of the stylus and/or a computing device configured to interact with the stylus. The one or more computing nodes may implement the first settings associated with the identifier of the touchscreen input device. Implementing the first settings may include prompting the user to indicate whether the first settings should be applied on the one or more computing nodes or automatically applying the first settings in response to receiving the identifier of the touchscreen input device. The first settings may relate comprise a visual feedback setting, an audio setting, a tactile setting, or a programmatic setting, or a combination thereof.

At block 904, a reconfiguration gesture may be detected by one or more sensors and information relating to the detection of the reconfiguration gesture may be received by the one or more computing nodes, such as servers 530. The reconfiguration gesture may be detected based on predefined movement of the touchscreen input device, a predefined proximity to a configuration device, an interaction with a select portion of a configuration device, a button press, an interaction with a mechanical interface, an audible input, a threshold temperature, a threshold pressure, an orientation of the stylus, or a location of the stylus, or a combination of the foregoing examples, and so on thereof. Various sensors such as gyroscopes, optical sensors, proximity sensors, and the like may be configured to measure a change in the position of the touchscreen input device. For example, the reconfiguration gesture may comprise inverting the touchscreen input device. As such, when the touchscreen input device is moved from a normal position to an inverted position, the gyroscope (or other sensor) can detect the inversion. As another example, the reconfiguration gesture may comprise contacting the touchscreen input device with a designated portion of a touchscreen. As a further example, similar to a fountain pen being moved to an ink well to replenish ink, the touchscreen input device may be moved toward a computing device (e.g., configuration device 630) and may contact the computing device or come within a predefined proximity thereof. As such, the ink well movement gesture may be detected by one or more sensors disposed in the touchscreen input device or the computing device.

In certain aspects, the reconfigure gesture may be implemented using the touchscreen input device. As an example, the reconfiguration gesture may be used to configure the first operational profile associated with a configurable insert disposed in touchscreen input device. As another example, predefined movement may be executed to cause the profile to change configuration. As a further example, the predefined movement is defined relative to a computing device config-ured to interact with the stylus. Other gestures or mechanism may be used to configure the configurable insert disposed in touchscreen input device.

At block 905, a second operational profile associated with the detected identifier may be received or accessed by one or more computing nodes, such as the servers 530. The second operational profile may be applied to control a feedback based on the interaction of the touchscreen input device and the computing devices 520, 620. The second operational profile may be accessed or received in response to the detection of the reconfiguration gesture. In an aspect, the second operational profile may be retrieved from a data store based at least in part on the detection of the reconfiguration gesture. The datastore may be disposed remotely from the touchscreen input device or integrated with the touchscreen input device. As an example, the once the reconfiguration gesture is detected, then the second operational profile can be automatically accessed, such as via an automatic download of the second operational profile from the datastore.

The second operational profile may be a configurable profile and may include second settings for controlling at least one operational feature of the stylus. The one or more computing nodes may implement the second settings associated with the identifier of the touchscreen input device. Implementing the second settings may include prompting the user to indicate whether the second settings should be applied on the one or more computing nodes or automatically applying the second settings in response to receiving the identifier of the touchscreen input device. The first settings may comprise a visual feedback setting, an audio setting, a tactile setting, or a programmatic setting, or a combination thereof. As an example, one or more of the first operational profile and the second operational profile further include information for controlling at least one operational feature of a computing device configured to interact with the stylus. Operational features can comprise at least one of a line width, color, graphical texture, color decay, pressure response curve, interface layout, mapping of physical location to screen location, position mode, program-specific effects, program-specific behavior, or tool type. As a further example, one or more of the first operational profile and the second operational profile further includes information for controlling at least one operational feature of a program executing via the computing device.

At block 906, the second operational profile may be associated with the detected identifier by the servers. As an example, associating the second operational profile to the identifier may comprise logically mapping or linking the second operational profile to the identifier. Mapping may comprise the modification of metadata and/or a database relating to the second operation profile. As such, when the identifier is subsequently detected, the second operational profile may be automatically accessed to control operations of at least the touchscreen input device.

Figure 10:
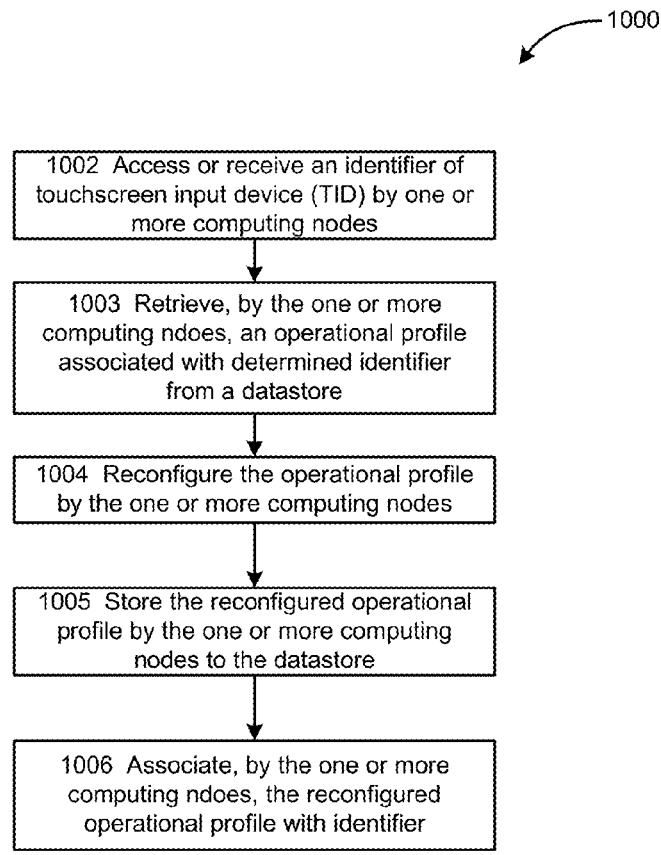
FIG. 10 depicts an example of a method by which a user of a touchscreen input device may be configured.

FIG. 10 depicts an example operating procedure 1000 for reconfiguring an operational profile associated with an insert for a touchscreen input device such as a stylus. The example operating procedure 1000 may be performed by one or more computing nodes (e.g., processor, computing device, physical host, virtual machine, etc.) to facilitate the retrieval of one or more operational profiles and application of the one or more operational profiles to effect an output of the touchscreen input device. The operating procedure 1000 will be discussed in reference to FIGS. 5, 6, and 10.

At block 1002, the one or more computing nodes such as servers 530 may access or receive an identifier of a touchscreen input device. The identifier of the touchscreen input device may be received or accessed via a wireless signal, such as an NFC signal, a Bluetooth® signal, a WiFi signal and the like. The identifier of the touchscreen input device may detected by one or more of an electrical contact and an optical sensor. The identifier of the touchscreen input device may be stored in the one or more computing nodes. For example, the one or more computing nodes may have stored profile information associated with the identifier of the touchscreen input device, configuration settings associated with the identifier of the touchscreen input device touchscreen input device or any other type of settings.

At block 1003 an operational profile associated with the detected identifier may be accessed or received by the servers 530, for example from a datastore disposed locally or remotely to the touchscreen input device. As an example, the detected identifier may be used as part of a query or look-up to retrieve the stored first operational profile. As another example, the detected identifier may be mapped or linked to a location of the first operational profile. The operational profile may be a configurable profile and may include first settings for controlling at least one operational feature of the stylus. The one or more computing nodes may implement the first settings associated with the identifier of the touchscreen input device. Implementing the first settings may include prompting the user to indicate whether the first settings should be applied on the one or more computing nodes or automatically applying the first settings in response to receiving the identifier of the touchscreen input device. The first settings may relate comprise a visual feedback setting, an audio setting, a tactile setting, or a programmatic setting, or a combination thereof. The first settings may relate to at least one of a line width, color, graphical texture, color decay, pressure response curve, interface layout, mapping of physical location to screen location, position mode, program-specific effects, program-specific behavior, or tool type.

At block 1004 the operational profile may be reconfigured by the servers 530. In certain aspects, the reconfiguration of the operational profile may be implemented using the touchscreen input device. As an example, one or more of the first settings may be manually modified to result in second settings different from the first settings. Various events may be defined to trigger the modification of the first settings resulting in reconfiguration of the operational profile. Such events may comprise a time period, a particular position of the touchscreen input device, a particular movement of the touchscreen input device, and the like. Such events may be detected by one or more sensors such as proximity sensors, optical sensors, gyroscopic sensors, timers, etc. At block 1004 a reconfiguration of the operational profile may be detected. In certain aspects, the reconfiguration of the operational profile may be implemented using the touchscreen input device. As an example, one or more of the first settings may be modified to result in second settings different from the first settings.

At block 1005 the reconfigured operational profile may be stored by the servers 530. As an example, the reconfigured operational profile may be stored in a datastore where the original operational profile is stored. At block 1006 the stored reconfigured operational profile may be associated with the detected identifier. As such, when the identifier is subsequently detected, the reconfigured operational profile may be accessed to control operations of at least the touchscreen input device.

Figure 11:
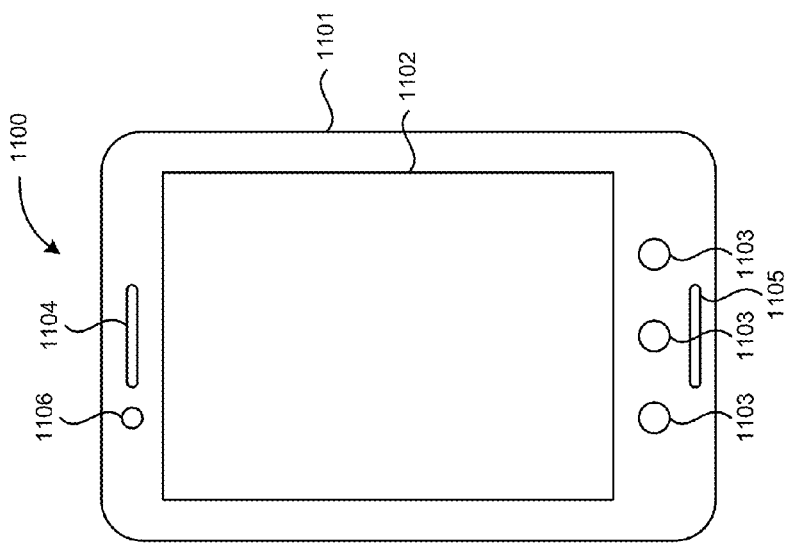
FIG. 11 depicts an embodiment of external components of a computing device.

FIG. 11 depicts an embodiment of external components of a computing device 1100. It should be understood that this is merely an example for discussion, and that a number of additional components, configurations, assemblies and combinations are possible as known in the art. Computing device 1100 may be any form of a computer, such as a desktop computer or laptop computer, a tablet computing device, a cell phone, a handheld computing device, or any other form of computing device. Computing device 1100 may include a housing 1101. The housing 1101 may be made of any material or combinations of materials, such as various types of plastic, metal, glass and combinations thereof, that is suitable to house the components of computing device 1100. Computing device 1100 may also include a display 1102 that may display images, text, any other type of visual information and any combination thereof. Display 1102 may also be a touchscreen display that is capable of sensing the presence and location of one or more touches of the display 1102. A touchscreen display may sense touches by a user, such as a touch by a finger or a hand, and touches by objects, such as by a stylus. Display 1102 may be part of a user interaction system of the computing device 1100.

Computing device 1100 may also include one or more hard buttons 1103 integrated into housing 1101. In one embodiment, the one or more hard buttons 1103 may include a single button, such as a home button or a power button. In another embodiment, the one or more hard buttons 1103 may include a small set of buttons, such as a power button, a home button and a back button. In yet another embodiment, the one or more hard buttons 1103 may include a large set of buttons, such as a full QWERTY keyboard, a keypad and the like. The one or more hard buttons 1103 may be part of the user interaction system of the computing device 1100.

Computing device 1100 may also include a speaker 1104 configured to emit sounds and a microphone 1105 configured to receive sounds. In the embodiment where computing device 1100 is a cell phone, speaker 1104 and microphone 1105 may be used to carry on a telephone call. In one embodiment, speaker 1104 may be configured to play sounds associated with graphics displayed on display 1102, such as during play of audiovisual material on computing device 1100. In another embodiment, microphone 1105 may receive audio sounds, which the computing device 1100 may interpret as user inputs. In addition, while not depicted in FIG. 11, computing device 1100 may also include an audio port, which may be connected to an external microphone and/or an external speaker or speakers. Computing device 1100 may send and receive audio signals via the audio port and interpret the received audio signals via the audio port just as it would interpret audio signals generated from sounds received by the microphone 1105.

Computing device 1100 may also include one or more optical devices 1106. In one embodiment, an optical device may include an optical sensor, such as an infrared sensor, a visible light sensor and/or any device that may sense light and/or electromagnetic energy. The detection of light and/or electromagnetic energy may be used by the computing device 1100 to control components of the computing device 1100, such as a level of light emitted by a backlight of display 1102, illumination of one or more hard buttons 1103 and any other aspect of computing device 1100. In another embodiment, an optical device may include an image-capturing device, such as a digital camera. An image-capturing device may include any device configured to capture an image, such as a complementary metal-oxide-semiconductor (CMOS) active pixel sensor (APS) and a charged coupled device (CCD). Images captured by one or more optical devices 1106 may be stored by the computing device 1100 as individual images or as a series of images in a video. Individual images and/or video images may be processed by computing device 1100 and interpreted as user inputs. While FIG. 11 depicts one of the optical devices 1106 pointing in the same direction as the display 1102, it is possible for computing device 1100 to have any number of optical devices 1106, and it is possible for one or more optical devices 1106 to be pointed in other directions, such as a rear-facing camera pointing in the opposite direction of display 1102.

Figure 12:
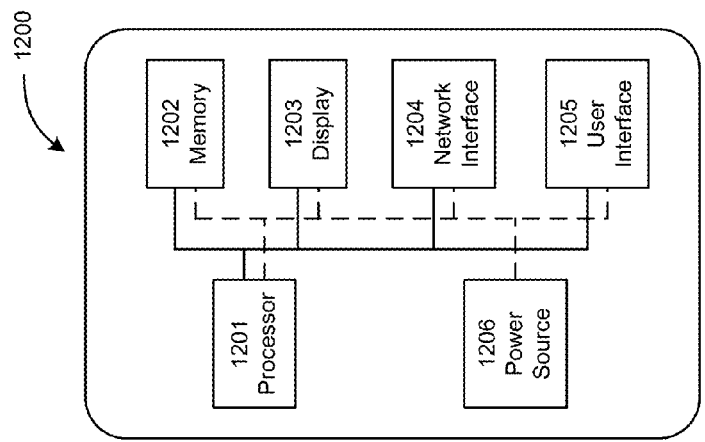
FIG. 12 depicts an embodiment of internal components of a computing device.

FIG. 12 depicts an embodiment of internal components of a computing device 1200. It should be understood that this is merely an example for discussion and that a number of additional components, configurations, assemblies and combinations are possible as known in the art. Computing device 1200 may include at least one processor 1201 that is able to execute instructions stored in one or more memories 1202. The one or more memories 1202 may include instructions for running an operating system, instructions for running one or more applications within the operating system, a system management agent and any other kind of instructions. The at least one processor 1201 may generate information on a display component 1203. Display component 1203 may include one or more of a display driver, a display card, display or any other hardware and/or software required to display an image or series of images. Computing device 1200 may also include a network interface 1204 that allows the device to send and receive information signals via a network. Network interface 1204 may include any type of network adapter for connecting to a network, such as an adapter to establish a connection to the Internet, to a wired or wireless intranet, to a cellular network or to a wireless network. Computing device 1200 may also include a user interface 1205. User interface 1205 may include one or more components, such as display 1102, one or more hard buttons 1103, speaker 1104, microphone 1105 and optical devices 1106, that may provide information to a user and/or receive inputs from a user. User interface 1205 may also include one or more external components, such as an external keyboard, external mouse, external microphone, external speaker and the like.

Computing device 1200 may include a power source 1206. Power source 1206 may provide power to any or all of the other components in computing device 1200. As depicted in FIG. 12, power source 1206 may be connected to, and provide power to, each of processor 1201, memory 1202, display 1203, network interface 1204 and user interface 1205. Power source may be any type of power source, such as one or more disposable batteries, a rechargeable battery and the like. In the embodiment where computing device 1200 is a portable device, such as a laptop computer, a tablet computer, a cell phone, a hand held computer and the like, the power source 1206 may need to provide power for a period of time between recharging of the power source 1206. When power source 1206 is not connected to an external power source, computing device 1200 is drawing on the power stored in power source 1206. The capacity of power source 1206 may vary with the type and size of power source 1206. The rate at which power source 1206 discharges depends on a number of factors, such as which components of computing device 1200 are active, how much power each of the active components are drawing from power source 1206 and the like.

FIG. 13 illustrates an example computing environment in which the embodiments described herein may be implemented. FIG. 13 is a diagram schematically illustrating an example of a data center 1310 that may provide computing resources to users 1300a and 1300b (which may be referred herein singularly as user 1300 or in the plural as users 1300) via user computers 1302a and 1302b (which may be referred herein singularly as computer 1302 or in the plural as computers 1302) via a communications network 1330. Data center 1310 may be configured to provide computing resources for executing applications on a permanent or an as-needed basis. The computing resources provided by data center 1310 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be general-purpose or may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These web services may be configurable with set or custom applications and may be configurable in size, execution, cost, latency, type, duration, accessibility and in any other dimension. These web services may be configured as available infrastructure for one or more clients and may include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols such as transmission control protocol (TCP) and less reliable transport layer protocols such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 1310 may include servers 1316a-b (which may be referred herein singularly as server 1316 or in the plural as servers 1316) that provide computing resources. These resources may be available as bare metal resources or as virtual machine instances 1318a-d and (which may be referred herein singularly as virtual machine instance 1318 or in the plural as virtual machine instances 1318). The availability of virtualization technologies for computing hardware has provided benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that spans multiple distinct physical computing systems.

Referring to FIG. 13, communications network 1330 may, for example, be a publicly accessible network of linked networks and possibly operated by various distinct parties, such as the Internet. In other embodiments, communications network 1330 may be a private network, such as, a corporate or university network that is wholly or partially inaccessible to non-privileged users. In still other embodiments, communications network 1330 may include one or more private networks with access to and/or from the Internet.

Communications network 1330 may provide access to computers 1302. User computers 1302 may be computers utilized by users 1300 or other customers of data center 1310. For instance, user computer 1302a or 1302b may be a server, a desktop or laptop personal computer, a tablet computer, a wireless telephone, a personal digital assistant (PDA), an e-book reader, a game console, a set-top box or any other computing device capable of accessing data center 1310. User computer 1302a or 1302b may connect directly to the Internet (e.g., via a cable modem or a Digital Subscriber Line (DSL)). Although only two user computers 1302a and 1302b are depicted, it should be appreciated that there may be multiple user computers.

User computers 1302 may also be utilized to configure aspects of the computing resources provided by data center 1310. In this regard, data center 1310 might provide a gateway or web interface through which aspects of its operation may be configured through the use of a web browser application program executing on user computer 1302. Alternately, a stand-alone application program executing on user computer 1302 might access an application programming interface (API) exposed by data center 1310 for performing the configuration operations. Other mechanisms for configuring the operation of various web services available at data center 1310 might also be utilized.

Servers 1316 shown in FIG. 13 may be standard servers configured appropriately for providing the computing resources described above and may provide computing resources for executing one or more web services and/or applications. In one embodiment, the computing resources may be virtual machine instances 1318. In the example of virtual machine instances, each of the servers 1316 may be configured to execute an instance manager 1320a or 1320b (which may be referred herein singularly as instance manager 1320 or in the plural as instance managers 1320) capable of executing the virtual machine instances 1318. The instance managers 1320 may be a virtual machine monitor (VMM) or another type of program configured to enable the execution of virtual machine instances 1318 on server 1316, for example. As discussed above, each of the virtual machine instances 1318 may be configured to execute all or a portion of an application.

It should be appreciated that although the embodiments disclosed above discuss the context of virtual machine instances, other types of implementations may be utilized with the concepts and technologies disclosed herein. For example, the embodiments disclosed herein might also be utilized with computing systems that do not utilize virtual machine instances.

In the example data center 1310 shown in FIG. 13, a router 1314 may be utilized to interconnect the servers 1316a and 1316b. Router 1314 may also be connected to gateway 1340, which is connected to communications network 1330. Router 1314 may be connected to one or more load balancers, and alone or in combination may manage communications within networks in data center 1310, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 13 has been greatly simplified and that many more networks and networking devices may be utilized to interconnect the various computing systems disclosed herein. These network topologies and devices should be apparent to those skilled in the art.

It should also be appreciated that data center 1310 described in FIG. 13 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway or other computing device may comprise any combination of hardware or software that may interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 14:
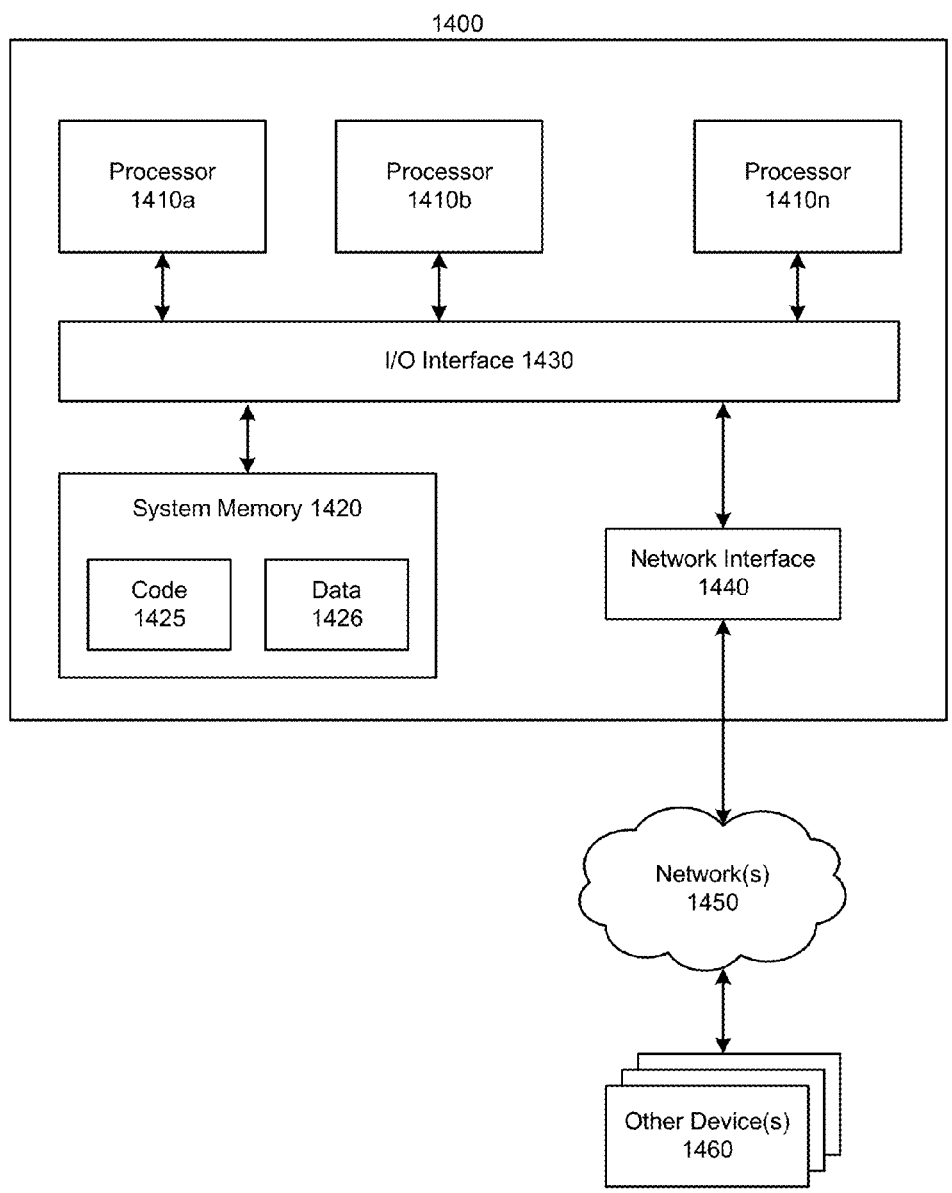
FIG. 14 depicts a diagram illustrating an example computing system that may be used in some embodiments.

In at least some embodiments, a server that implements a portion or all of one or more of the technologies described herein may include a general-purpose computer system that includes or is configured to access one or more computer-accessible media. FIG. 14 depicts a general-purpose computer system that includes or is configured to access one or more computer-accessible media. In the illustrated embodiment, computing device 1400 includes one or more processors 1410a, 1410b and/or 1410n (which may be referred herein singularly as "a processor 1410" or in the plural as "the processors 1410") coupled to a system memory 1420 via an input/output (I/O) interface 1430. Computing device 1400 further includes a network interface 1440 coupled to I/O interface 1430.

In various embodiments, computing device 1400 may be a uniprocessor system including one processor 1410 or a multiprocessor system including several processors 1410 (e.g., two, four, eight or another suitable number). Processors 1410 may be any suitable processors capable of executing instructions. For example, in various embodiments, processors 1410 may be general-purpose or embedded processors implementing any of a variety of instruction set architectures (ISAs), such as the x86, PowerPC, SPARC or MIPS ISAs or any other suitable ISA. In multiprocessor systems, each of processors 1410 may commonly, but not necessarily, implement the same ISA.

System memory 1420 may be configured to store instructions and data accessible by processor(s) 1410. In various embodiments, system memory 1420 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 1420 as code 1425 and data 1426.

In one embodiment, I/O interface 1430 may be configured to coordinate I/O traffic between processor 1410, system memory 1420 and any peripherals in the device, including network interface 1440 or other peripheral interfaces. In some embodiments, I/O interface 1430 may perform any necessary protocol, timing or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. Also, in some embodiments some or all of the functionality of I/O interface 1430, such as an interface to system memory 1420, may be incorporated directly into processor 1410.

Network interface 1440 may be configured to allow data to be exchanged between computing device 1400 and other device or devices 1460 attached to a network or networks 1450, such as other computer systems or devices, for example. In various embodiments, network interface 1440 may support communication via any suitable wired or wireless general data networks, such as types of Ethernet networks, for example. Additionally, network interface 1440 may support communication via telecommunications/telephony networks, such as analog voice networks or digital fiber communications networks, via storage area networks, such as Fibre Channel SANs (storage area networks) or via any other suitable type of network and/or protocol.

In some embodiments, system memory 1420 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 1400 via I/O interface 1430. A non-transitory computer-accessible storage medium may also include any volatile or non-volatile media, such as RAM (e.g. SDRAM, DDR SDRAM, RDRAM, SRAM, etc.), ROM etc., that may be included in some embodiments of computing device 1400 as system memory 1420 or another type of memory. Further, a computer-accessible medium may include transmission media or signals, such as electrical, electromagnetic or digital signals, conveyed via a communication medium, such as a network and/or a wireless link, such as those that may be implemented via network interface 1440. Portions or all of multiple computing devices, such as those illustrated in FIG. 14, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A network set up by an entity, such as a company or a public sector organization to provide one or more web services (such as various types of cloud-based computing or storage), accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Thus, as set forth above, a content provider may provide content to a destination over a network, such as the Internet, using, for example, streaming content delivery techniques. A content provider may, for example, provide a content delivery service that may reside on one or more servers. The service may be scalable to meet the demands of one or more customers and may increase or decrease in capability based on the number and type of incoming client requests. The content delivery service may, in some cases, process a content item in parallel across multiple nodes of the content delivery service. This may be done, in one embodiment, to reduce the latency for rendering the content item. Portions of the content delivery service may also be migrated to be placed in a position of reduced latency with a requesting client. In some cases, the content provider may determine an "edge" of a system or network associated with the content provider that is physically and/or logically closest to a requesting client. The content provider may then, for example, "spin-up," migrate resources or otherwise employ components associated with the determined edge for interacting with requests from the client. Such an edge determination process may, in some cases, provide an efficient technique for identifying and employing components that are well suited to interact with a particular client, and may, in some embodiments, reduce the latency for communications between a content provider and one or more clients.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto may be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "may," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A non-transitory computer-readable storage medium having stored thereon instructions that, upon execution by one or more computing nodes, cause the one or more computing nodes at least to:
   receive information comprising at least an identifier associated with a nib disposed in a stylus;
   determine a first operational profile associated with the identifier, wherein the first operational profile includes first settings for controlling at least one operational feature of at least one of the stylus and a computing device configured to interact with the stylus;
   receiving information relating to the detection of a reconfiguration gesture; and
   determine, based at least in part on the information relating to the detection of the reconfiguration gesture, a second operational profile, wherein the second operational profile includes second settings for controlling the at least one operational feature of the at least one of the stylus and the computing device configured to interact with the stylus; and
   associate the second operational profile with the identifier.

2. The non-transitory computer-readable storage medium of claim 1, wherein one or more of the first settings and the second settings comprise at least one of a visual feedback setting, an audio setting, a tactile setting, or a programmatic setting.

3. The non-transitory computer-readable storage medium of claim 1, wherein the reconfiguration gesture comprises at least a predefined movement of the stylus, a predefined proximity to a configuration device, an interaction with a select portion of a configuration device, a button press, an interaction with a mechanical interface, an audible input, a threshold temperature, a threshold pressure, an orientation of the stylus, or a location of the stylus.

4. A system for configuring an operational profile associated with an insert of a stylus, the system comprising:
   a stylus having an insert associated with an operational profile, the operational profile including settings for controlling at least one operational feature of at least one of the stylus and an interactive computing device configured to interact with the stylus; and
   one or more processors configured to:
      receive information relating to the reconfiguration of the settings of the operational profile;
      reconfigure the operational profile based at least in part on the received information;
      store the reconfigured operational profile; and
      associate the reconfigured operational profile with the stylus, wherein the at least one operational feature of at least one of the stylus and the interactive computing device is modified based on the reconfigured operational profile.

5. The system of claim 4, wherein the insert is removable.

6. The system of claim 4, wherein the settings comprise at least one of a visual feedback setting, an audio setting, a tactile setting, or a programmatic setting.

7. The system of claim 4, wherein the one or more processors are disposed in the stylus.

8. The system of claim 4, wherein the one or more processors are disposed in the interactive computing device and are in communication with the stylus.

9. The system of claim 4, wherein the one or more processors are disposed in a network device and are in communication with the stylus over a network.

10. The system of claim 4, wherein the interactive computing device comprise a user interface configured to present information relating the settings of the operational profile and wherein the information relating to the reconfiguration of the settings of the operational profile is received via the user interface.

11. The system of claim 4, wherein the at least one operational feature comprises at least one of a line width, color, graphical texture, color decay, pressure response curve, interface layout, mapping of physical location to screen location, position mode, program-specific effects, program-specific behavior, or tool type.

12. The system of claim 4, wherein the reconfigured operational profile is stored remotely from the stylus.

13. A method for configuring an operational profile associated with an insert of a stylus, the method comprising:
   receiving, by one or more processors, an identifier associated with an insert disposed in a stylus;
   determining, by the one or more processors, a first operational profile associated with the identifier, wherein the first operational profile includes settings for controlling at least one operational feature of at least one of the stylus and a computing device configured to interact with the stylus;
   determining, by the one or more processors, a reconfiguration of the first operational profile;
   storing the reconfigured operational profile as a second operational profile; and
   associating the second operational profile with the identifier.

14. The method of claim 13, wherein the one or more processors are disposed in the stylus.

15. The method of claim 14, wherein receiving the identifier comprises detecting at least one of an electrical conductor, an optical graphic, a mechanical feature, or a received wireless signal.

16. The method of claim 13, wherein the one or more processors are disposed in the interactive computing device and are in communication with the stylus.

17. The method of claim 13, wherein the one or more processors are disposed in a network device and are in communication with the stylus over a network.

18. The method of claim 13, wherein the at least one operational feature comprises at least one of a line width, color, graphical texture, color decay, pressure response curve, interface layout, mapping of physical location to screen location, position mode, program-specific effects, program-specific behavior, or tool type.

19. The method of claim 13, wherein determining the reconfiguration comprises detecting at least one of a predefined movement of the stylus, a predefined proximity to a configuration device, an interaction with a select portion of a configuration device, a button press, an interaction with a mechanical interface, an audible input, a threshold temperature, a threshold pressure, an orientation of the stylus, or a location of the stylus.

20. The method of claim 13, wherein the reconfigured operational profile is stored remotely from the stylus.

\* \* \* \* \*